United States Patent Office 3,661,817
Patented May 9, 1972

3,661,817
CURABLE COMPOSITIONS
Stephen B. Hamilton, Schenectady, Melvin D. Beers, Ballston Lake, and Abe Berger and Terry G. Selin, Schenectady, N.Y., assignors to General Electric Company, New York, N.Y.
No Drawing. Filed May 4, 1970, Ser. No. 34,576
Int. Cl. C08h 9/00
U.S. Cl. 260—18 S
46 Claims

ABSTRACT OF THE DISCLOSURE

Room temperature vulcanizing silicone elastomers are prepared by the addition of a novel cross-linking agent such as acetoxypropenylenyltriacetoxysilane to a silanol chain-stopped polydiorganosiloxane fluid. These compositions are stable, free flowing fluids in the absence of moisture but cure to a rubbery, solid elastic state upon exposure to moisture. These compositions are particularly useful as adhesives in difficult bonding situations such as attaching glass window panes to aluminum window frames.

BACKGROUND OF THE INVENTION

This invention pertains to fluid organopolysiloxanes which are capable of vulcanizing at room temperature to rubbery materials, to the cross-linking agents used in such compositions, and to the process of making the vulcanizable materials.

The prior art cross-linking agents which have found greatest commercial success are either solid at room temperature or unstable at room temperature and their use may result in products which are lacking in adhesion to particular substrates. A disadvantage of the prior art cross-linking systems which are solid at room temperature is that they must be heated to the liquid state prior to use. This necessitates an extra step in the manufacture of sealants utilizing this type of cross-linking agent and requires that all storage tanks and lines used to carry this agent be heated. Serious problems occasionally result when the heating element of one of the tanks or lines is defective and the cross-linking agent is allowed to crystallize. Considerable product that is deficient in cross-linking agent may be produced and packaged and equipment time, personnel time and product are lost.

The cross-linking agents which are unstable at room temperature must be maintained under refrigeration prior to use. Failure to maintain the materials under refrigeration results in disproportionation and, again, a product lacking in the desired properties.

The lack of adhesion of particular prior art sealants to particular substrates has also resulted in problems. For example, when glass is sealed into aluminum window frames, a defective bond between the aluminum and the sealant results in water leakage between the aluminum window frame and the glass mounted therein.

The prior art cross-linking systems are exemplified by the disclosures contained in U.S. Pat. 3,035,016 of Bruner which issued in 1962 and U.S. Pat. 3,296,195 of Goossens which issued in 1967. While these disclosed materials have enjoyed a measure of commercial success, they have not been completely successful in solving the problems of handling which were described.

SUMMARY OF THE INVENTION

In accordance with this invention there are provided organopolysiloxanes comprising a silanol chain-stopped polydiorganosiloxane, and at least one silane of the formula, (1) 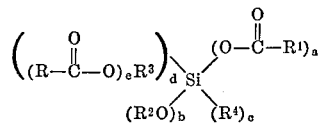

wherein R and $R^2$ are at least one radical having not more than about 8 carbon atoms selected from the group consisting of hydrocarbyl, halohydrocarbyl, nitrohydrocarbyl, alkoxyhydrocarbyl and cyano lower alkyl and can be different; $R^1$ and $R^4$ are at least one radical having not more than about 8 carbon atoms selected from the group consisting of hydrocarbyl and halohydrocarbyl and can be different; $R^3$ is at least one unsaturated radical having a valence of at least two and from about 3 to about 8 carbon atoms selected from the group consisting of divalent and trivalent unsaturated hydrocarbon radicals, and halo and alkoxy-substituted divalent and trivalent unsaturated hydrocarbon radicals; $a$ is an integer of one through 3, $b$ is a whole number of 0 through 2, $c$ is a while number of 0 through 2, $d$ is an integer of one through 3 and $e$ is an integer of one through 2 and the sum of $a$, $b$, $c$ and $d$ is 4.

It has been discovered that when acetoxyalkenyl-substituted silanes of Formula 1 are used as cross-linking agents for or as agents to defer cross-linking of silanol chain-stopped polydiorganosiloxane that the heating requirements, refrigeration requirements and lack of adhesion problems inherent in the manufacture and use of prior art materials no longer exist. The acetoxyalkenyl-substituted silanes are fluid and stable at room temperature and permit the production of sealants which have significantly improved adhesion to substrates when cured.

DESCRIPTION OF PREFERRED EMBODIMENTS

In the description the following definitions and terms apply unless otherwise specified. The term "hydrocarbyl" as used herein means a hydrocarbon from which one hydrogen atom has been removed, i.e., a monovalent hydrocarbon radical, the abbreviation "RTV" as used herein means a room temperature vulcanizable material.

A silanol chain-stopped polydiorganosiloxane useful in an RTV composition of this invention may be represented by the formula, (2) 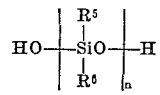

wherein $R^5$ and $R^6$ are each organic radicals of not more than 8 carbon atoms selected from the group consisting of hydrocarbyl, halohydrocarbyl, and cyano lower alkyl and $n$ is a number from about 5 to about 15,000 or more.

The silanol chain-stopper polydiorganosiloxanes are well known in the art and include compositions containing different $R^5$ and $R^6$ groups. For example, the $R^5$ groups can be methyl while the $R^6$ groups can be phenyl and/or beta-cyanoethyl. Furthermore, within the scope of the definition of polydiorganosiloxanes useful in this invention are copolymers of various types of diorganosiloxane units, such as silanol chain-stopped copolymers of dimethylsiloxane units, diphenylsiloxane units and methylphenylsiloxane units or, for example, copolymers of dimethylsiloxane units, methylphenylsiloxane units and methylvinylsiloxane units. Preferably, at least 50% of the $R^5$ and $R^6$ groups of the silanol chain-stopped polydiorganosiloxanes are methyl groups.

A mixture of various silanol chain-stopped polydiorganosiloxanes also may be employed. The silanol chain-stopped materials useful in the RTV compositions of this invention have been described as polydiorganosiloxanes but such materials can also contain minor amounts, e.g., up to about 20% of monoorganosiloxane units such as monoalkylsiloxane units, e.g., monomethylsiloxane units and monophenylsiloxane units. The technology involved in incorporating monoalkylsiloxane units into RTV compositions is disclosed in U.S. Pat. 3,382,205 of Beers (1968), which is hereby incorporated into the present application by reference. The silanol chain-stopped materials may also contain triorganosiloxane units, such as trialkylsiloxane units, e.g., trimethylsiloxane units, tributylsiloxane units and triphenylsiloxane units. The silanol chain-stopped materials may also contain t-alkoxysiloxane units, e.g., t-butoxysiloxane units, t-pentoxysiloxane units, and t-amyloxysiloxane units. Effective results can be obtained if sufficient t-alkoxysiloxane is utilized in combination with the silanol-terminated polydiorganosiloxane of Formula 2 to provide a polymer having a ratio of t-alkoxysiloxane units to silanol of 0.05 to 0.9 and preferably 0.2 to 0.8 tert-alkoxydialkylsiloxy units per silanol. Many of the t-alkoxysiloxanes useful as part of the silanol chain-stopped materials are described and claimed in U.S. Pat. 3,438,930 of Beers, which issued Apr. 15, 1969 and is assigned to the General Electric Company, the disclosure of which is expressly incorporated herein by reference.

The silanol chain-stopped polydiorganosiloxanes employed in the practice of the present invention may vary from low viscosity thin fluids to viscous gums, depending upon the value of $n$ and the nature of the particular organic groups represented by $R^5$ and $R^6$.

In the above Formula 1 R and $R^2$ may be, for example, aryl, such as phenyl, benzyl, tolyl, xylyl and ethylphenyl; halogen-substituted aryl, such as 2,6-di-chlorophenyl, 4-bromophenyl, 2,5-di-fluorophenyl, 2,4,6 - trichlorophenyl and 2,5-dibromophenyl; nitro-substituted aryl, such as 4-nitrophenyl and 2,6-di-nitrophenyl; alkoxy - substituted aryl, such as 4-methoxyphenyl, 2,6-dimethoxyphenyl, 4-t-butoxyphenyl, 2-ethoxyphenyl, and 2,4,6-trimethoxyphenyl; alkyl, such as methyl, ethyl, n-propyl, isopropyl, n-butyl, sec-butyl, isobutyl, tert-butyl, amyl, hexyl, heptyl, octyl, and the various homologs and isomers of alkyl of not more than about 8 carbon atoms; alkenyl such as vinyl, allyl, n-butenyl-1, n-butenyl-2, n-pentenyl-2, n-hexenyl-2, 2,3 - dimethylbutenyl - 2, n - heptenyl, n-octenyl, and the various homologs and isomers of alkenyl of not more than about 8 carbon atoms; alkynyl such as propargyl, 2-butynyl and the various homologs and isomers of alkynyl of not more than about 8 carbon atoms; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, chloropentyl, bromopentyl, 2,3-dichloropentyl, 3,3-dibromopentyl, chlorohexyl, bromohexyl, 2,4 - dichlorohexyl, 1,3 - dibromohexyl, 1,3,4 - trichlorohexyl, chloroheptyl, bromoheptyl, fluoroheptyl, 1,3-dichloroheptyl, 1,4,4-trichloroheptyl, 2,4-dichloromethylheptyl, chlorooctyl, bromooctyl, iodooctyl, 2,4 - dichloromethylhexyl, 2,4 - dichlorooctyl, 2,4,4 - trichloromethylpentyl, 1,3,5-tribromooctyl and the various homologs and isomers of haloalkyl of not more than about 8 carbon atoms; haloalkenyl such as chlorovinyl, bromovinyl, chloroallyl, bromoallyl, 3-chloro-n-butenyl-1,3 - chloro-n-pentenyl-1, 3-fluoro-n-heptenyl - 1, 1,3,3 - trichloro - n-heptenyl-5, 1,3,5-trichloro-n-octenyl - 6, 2,3,3 - trichloromethylpentenyl-4 and the various homologs and isomers of haloalkenyl of not more than about 8 carbon atoms; haloalkynyl such as chloropropargyl, bromopropargyl and the various homologs and isomers of haloalkynyl of not more than about 8 carbon atoms; nitroalkyl such as nitromethyl, nitroethyl, nitro-n-propyl, nitro - n - butyl, nitropentyl, 1,3-dinitroheptyl and the homologs and isomers of nitroalkyl of not more than about 8 carbon atoms; nitroalkenyl such as nitroallyl, 3-nitro-n-butenyl-1, 3-nitro-n-heptenyl-1, and the various homologs and isomers of nitroalkenyl of not more than about 8 carbon atoms; nitroalkynyl such as nitropropargyl and the various homologs and isomers of nitroalkynyl of not more than about 8 carbon atoms; alkoxyalkyl and polyalkoxyalkyl such as methoxymethyl, ethoxymethyl, butoxymethyl, methoxyethyl, ethoxyethyl, ethoxyethoxyethyl, methoxyethoxymethyl, butoxymethoxyethyl, ethoxybutoxyethyl, methoxypropyl, butoxypropyl, methoxybutyl, butoxybutyl, methoxypentyl, butoxypentyl, methoxymethoxypentyl, butoxyhexyl, methoxyheptyl, ethoxyethoxy and the various homologs and isomers of alkoxyalkyl and polyalkoxyalkyl of not more than about 8 carbon atoms; alkoxyalkenyl and polyalkoxyalkenyl such as ethoxyvinyl, methoxyallyl, butoxyallyl, methoxy-n-butenyl-1, butoxy-n-pentenyl-1, methoxyethoxy-n-heptenyl-1, and the various homologs and isomers of alkoxyalkenyl and polyalkoxyalkenyl of not more than about 8 carbon atoms; alkoxyalkynyl and polyalkoxyalkynyl such as methoxypropargyl and the various homologs and isomers of alkoxyalkynyl and polyalkoxyalkynyl of not more than about 8 carbon atoms; cycloalkyl, cycloalkenyl and alkyl, halogen, alkoxy and nitro-substituted cycloalkyl and cycloalkenyl such as cyclopentyl, cyclohexyl, cycloheptyl, cyclooctyl, cyclononyl, 6-methylcyclohexyl, 2,5-dimethylcycloheptyl, 4-butylcyclopentyl, 3,4 - dichlorocyclohexyl, 2,6-dibromocycloheptyl, 6-methoxycyclooctyl, 2-nitrocyclopentyl, 1-cyclopentenyl, 3-methyl-1-cyclopentenyl, 5-methoxy-1-cyclopentenyl, 3,4-dimethyl-1 - cyclopentenyl, 2,5-dimethoxy-1-cyclopentenyl, 5-methyl-5-cyclopentenyl, 3,4-dichloro-5-cyclopentenyl, 5-(tert-butyl)-1 - cyclopentenyl, 2-nitro-1-cyclohexenyl, 1-cyclohexenyl, 3-methyl-1-cyclohexenyl, 3,4-dimethyl - 1 - cyclohexenyl and 6-methoxy-1-cyclohexenyl; and cyano lower alkyl such as cyanomethyl, beta-cyanoethyl, gamma-cyanopropyl, delta-cyanobutyl and gamma-cyanoisobutyl.

In Formula 1, $R^1$ and $R^4$ may be hydrocarbyl and halohydrocarbyl such as those listed above for R and $R^2$.

Examples of divalent and trivalent unsaturated radicals represented by $R^3$ present in the compositions of this invention are, for example,

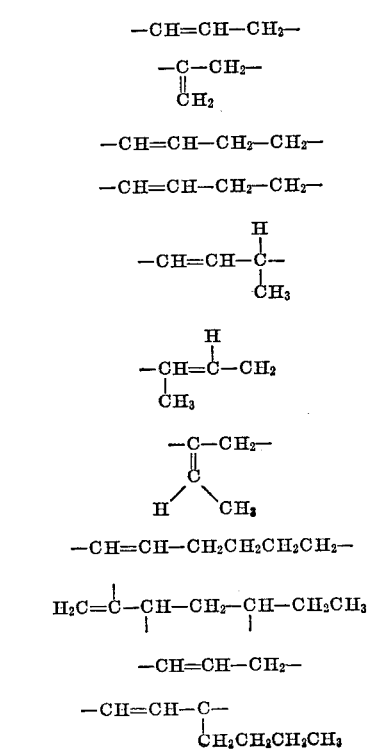

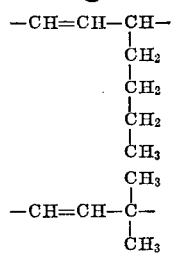

The indicated valence of the —C=C of the unsaturated radicals is attached to silicon and the other indicated valences of the unsaturated radicals are attached to acyloxy radicals.

In Formula 2, the hydrocarbyl and substituted hydrocarbyl $R^5$ and $R^6$ can be those radicals listed above for R and $R^2$.

Examples of silanes useful in the RTV composition of this invention include the following:

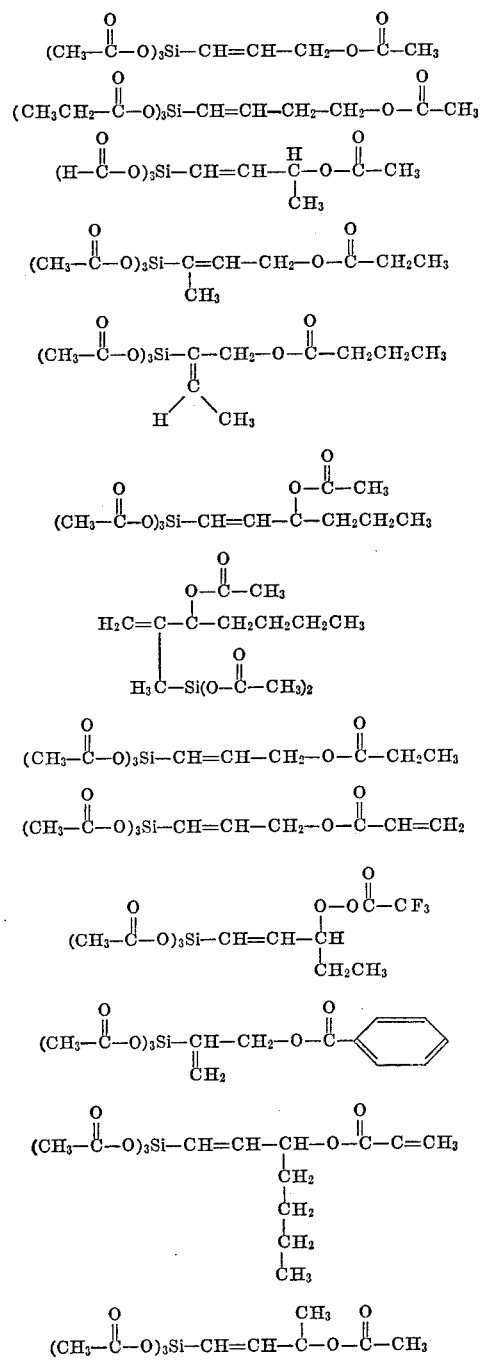

Other examples are readily apparent from the description of the substituents which may be present on the silane.

The RTV composition of this invention may be prepared simply by admixing one or more of the silanes of Formula 1, having an average of at least about 2.05 silicon-bonded acyloxy radicals per silicon atom with the silanol chain-stopped polydiorganosiloxane. The components are preferably at room temperature during mixing. Since the silane tends to hydrolyze upon contact with moisture, care should be exercised to exclude moisture during the addition of the silane to the silanol chain-stopped polydiorganosiloxane. Likewise, care should be taken that the mixture of the silane and the silanol chain-stopped polydiorganosiloxane is maintained under substantially anhydrous conditions if it is desired to store the admixture for an extended period of time prior to conversion of the composition to the cured, solid, elastic silicone rubber state. On the other hand if it is desired to permit the mixture to cure immediately upon admixture of the silane and the polydiorganosiloxane, no special precautions are necessary and the two components may be mixed and placed in the form or shape which is desired for the cured composition.

The amount of the silane admixed with the silanol chain-stopped polydiorganosiloxane may vary within wide limits; however, for best results, it is preferred to add an excess of one mole of the silane per mole of silanol groups in the silanol chain-stoped polydiorganosiloxanes. Satisfactory curing may be obtained, for example, with from about 1.0 to about 4 moles of the silane per mole of silanol groups in the polydiorganosiloxane. No particular benefit is derived from using more than 4 moles of the silane per mole of the polydiorganosiloxane.

The admixture may be carried out in the presence of an inert solvent, i.e., a solvent which will not react with the silanol, alkoxy or acyloxy groups on the silicon; and suitable solvents include hydrocarbon solvents such as benzene, toluene, xylene or petroleum ethers; halogenated solvents such as perchloroethylene or chlorobenzene and organic ethers such as diethylether and dibutylether; ketones such as methylisobutylketone and fluid, hydroxyl-free polysiloxanes. The presence of a solvent is particularly advantageous when the silanol chain-stopped polydiorganosiloxane used in a high molecular weight gum. The solvent reduces the overall viscosity of the composition. RTV compositions prepared in solvent solution may be stored in the absence of moisture in solution until used. This is particularly valuable when a high viscosity or "gummy" composition is to be employed in a coating or other similar application.

Adhesion to various substrates containing an oxide film may be improved by the addition of a di-t-alkoxydiacetoxysilane to an RTV composition of this invention. The technology involved in the addition of this type of material is disclosed in U.S. Pat. 3,296,161 of Kulpa, which is hereby incorporated by reference.

The RTV compositions of this invention are stable for substantial periods in the absence of moisture. Consequently they can be stored for prolonged periods of time without deleterious effect. During proper storage no significant change occurs in the physical properties of the RTV compositions. This is of particular importance from a commercial standpoint, since it assures that once an RTV composition is prepared with a certain consistency and cure time that neither will change significantly upon storage. Storage stability is one of the characteristics which takes the compositions of this invention particularly valuable as a one component room temperature vulcanizing composition.

A wide choice of components is available in the preparation of an RTV composition of this invention. In general, the particular components employed are a function of the properties desired in the cured silicone rubber.

Thus, with a particular silane some variation in the properties of the cured silicone rubber are obtained by varying the molecular weight (as measured indirectly by viscosity) of the silanol chain-stopped polydiorganosiloxane. For a given system, as the viscosity of the silanol chain-stopped starting material increases, the hardness of the cured rubber decreases while the elongation increases. On the other hand, with a lower viscosity material, generally, the linear polymer chains are shorter and more cross-linking is effected resulting in a cured rubber having a lower elongation and increased hardness.

An RTV composition is prepared in accordance with this invention by mixing an acetoxyalkylpolyacetoxysilane with a silanol chain-stopped polydiorganosiloxane. The RTV may be used without further modification in many sealing, caulking or coating applications by merely placing the composition in the desired place and permitting it to cure upon exposure to the moisture present in the atmosphere. Upon exposure of such compositions to atmospheric moisture, even after storage for times as long as two years or more, a "skin" will form on the compositions shortly after exposure and cure to the rubbery state will occur within 12 to 24 hours, all at room temperature. The time required for the formation of such skin may vary from a minimum of about 5 to 10 minutes to a maximum of about 1 hour.

It is often desirable to modify the RTV composition of the present invention by the addition of various materials which act as extenders or which change various properties such as cure rate and color. For example, if it is desired to reduce the time required for complete cure by a factor of about 2 to 5, the composition may be modified by the incorporation of a minor amount of a carboxylic acid salt and/or chelates of a metal ranging from lead to manganese, inclusive, in the electromotive series of metals. Particular metals included are lead, tin, nickel, cobalt, iron, cadmium, chromium, zinc and manganese. Carboxylic acids from which the salts of these metals may be derived are monocarboxylic acids or dicarboxylic acids and the metallic salts may be either soluble or insoluble in the silanol chain-stopped polydiorganosiloxane used. Preferably, the salts employed are soluble in the silanol chain-stopped polydiorganosiloxane since this facilitates the uniform dispersion of the salt in the reaction mixture.

Illustrative of metal salts which may be employed are, for example, zinc naphthenate, lead naphthenate, cobalt naphthenate, iron 2-ethylhexoate, cobalt octoate, zinc octoate, lead octoate, chromium octoate and tin octoate. Operative metal salts also include those in which the metallic ion contains a hydrocarbon substituent, such as, for example, carbomethoxyphenyl tin tris-uberate, isobutyl tin triceroate, cyclohexenyl lead triactotinate, xenyl lead tris-alicylate, dimethyl tin dibutyrate, basic dimethyl tin oleate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bis-trichlorobenzoate, diphenyl lead diformate, dibutyl tin dilacetate, dicyclopentyl lead bis-monochloroacetate, dibenzyl lead di-2-pentanoate, diallyl lead di-2-hexenoate, triethyl tin tartrate, tributyl tin acetate, triphenyl tin acetate, tricyclohexyl tin acrylate, tritolyl tin terephthalate, tri-n-propyl lead acetate, tristearyl tin succinate, trinaphthyl lead p-methylbenzoate, tris-phenyl lead cyclohexenyl acetate, triphenyl lead ethylmalonate, etc.

The amount of the metal salt of the organic carboxylic acid which may be employed generally is a function of the increased rate of curing desired so that any amount of such salt up to a maximum effective amount for increasing the cure rate may be employed. In general, no particular benefit is derived from employing more than about 5% by weight of such a metal salt based on the weight of the silanol chain-stopped polydiorganosiloxane. Preferably, where such metal salt is employed, it is present in an amount equal to from about 0.01% to 2.0% by weight, based on the weight of the polydiorganosiloxane.

Metal chelates such as those disclosed in U.S. Pats. 3,334,067 and 3,065,194 may also be used in the RTV composition of this invention as catalysts in amounts from about 0.01 part to about 10 parts based on 100 parts of the silanol chain-stopped polydiorganosiloxane.

The RTV compositions of the present invention may be varied also by the incorporation of various extenders or fillers. Illustrative of the many fillers which may be employed with the composition of the present invention are titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. Silazane treated silica fillers such as those disclosed and claimed in copending application Ser. No. 789,352 of Smith, filed Jan. 6, 1969, are particularly suitable for use in the RTV composition of the present invention; and when used, generally, may be present in an amount of from about 5 to about 200 parts filler per 100 parts of silanol chain-stopped polydiorganosiloxane.

In addition to the modification of the RTV composition of the present invention by addition of a metal salt, cure accelerator, fillers or mixtures thereof, the composition of this invention may also be modified by the incorporation of various flame retardants, stabilizing agents and plasticizers such as siloxane fluids. Suitable flame retardants include antimony oxide, various polychlorinated hydrocarbons and organic sulfonates.

Where the compositions of the present invention contain components other than the silane and the polydiorganosiloxane, the various ingredients may be added in any desired order; however, for ease of manufacturing, it is often convenient to form a blend or mixture of all of the components of the room temperature vulcanizing organopolysiloxane except the silane, to then remove moisture from the resulting mixture by maintaining the mixture under vacuum, and thereafter to add the silane prior to packaging of the composition in containers protected from moisture.

The RTV composition of the present invention is particularly adapted for caulking and sealing applications where adhesion to various surfaces is important. For example, these materials are useful in household caulking applications and industrial applications such as on buildings, factories, automotive equipment and in applications where adhesion to masonry, glass, plastic, metal and wood is required.

The silanes of the present invention, i.e., those represented by Formula 1 are made by the following general procedure. The first step of the procedure involves reacting a silane with an acetylenically unsaturated ester via the following SiH-acetylene addition reaction to produce the following composition,

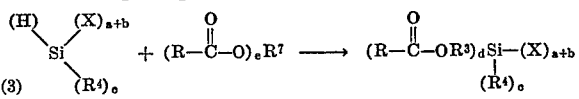

(3)

In the above formulas, R, $R^1$, $R^3$, $R^4$, $a$, $b$, $c$, $d$ and $e$ are as above defined, $R^7$ is an acetylenically unsaturated radical having from about 3 to about 8 carbon atoms selected from the group consisting of acetylenically unsaturated hydrocarbon radicals and halo, nitro and alkoxy-substituted acetylenically unsaturated hydrocarbon radicals, X is selected from the group comprising an acyloxy radical of the formula

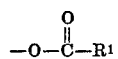

where $R^1$ is as previously defined or a halogen radical selected from the group consisting of F, Cl, Br and I; and the sum of $a+b$ has a value of 1 to 3. The reaction may be catalyzed by a platinum compound or a platinum complex catalyst. Both the platinum compound catalysts and the platinum complex catalysts are well known in the art and are described among other places in U.S. Pats. 2,923,-218—Speier, 3,159,601—Ashby, 3,159,662—Ashby, and 3,220,972—Lamoreaux.

When product purity is essential, the acetoxyalkenyltrihalosilane may be prepared first, then purified and then acetylated. It is much easier to purify the halosilane than the corresponding acyloxy-substituted silane because the halosilane does not have the tendency to condense that the acyloxysilanes may have at higher temperatures and thus may be more readily purified by distillation.

Examples of compounds of the formula R—C—O$_e$R$^7$ which can be employed in the above reaction include the following:

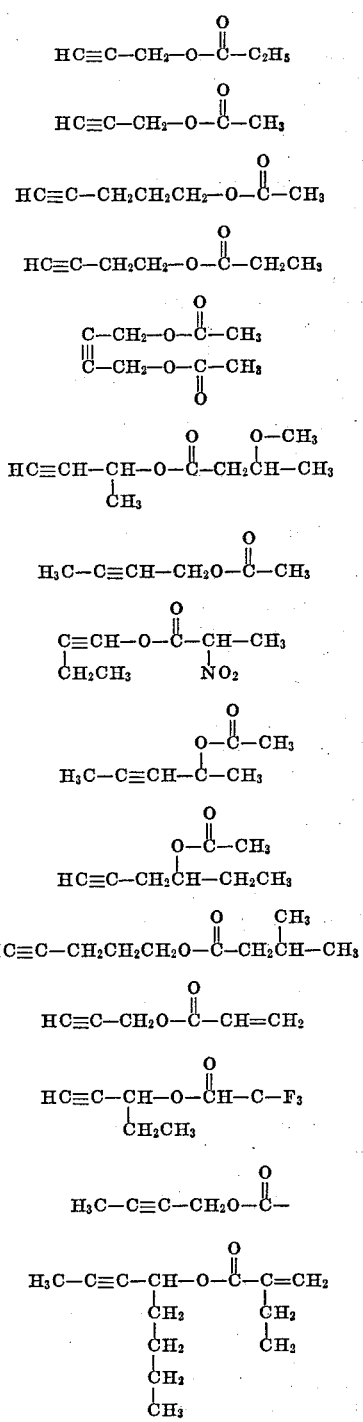

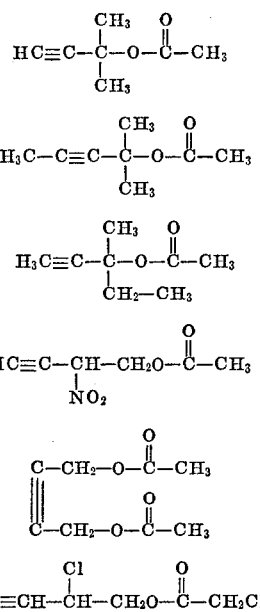

When X of Formula 3 is a halogen radical, acyloxy and/or alkoxy groups can be added to the composition formed by a variety of techniques any of which are suitable. The techniques which can be employed are generally set forth in U.S. Pat. 3,296,195 of Goossens which issued Jan. 3, 1967. As a first technique, the silane of Formula 3 can be reacted with acetic anhydride to produce a corresponding acetoxysilane or polyacetoxysilane plus acetyl chloride. The acetoxysilane or polyacetoxysilane is then reacted with the desired alkanol or halogenated, nitro or alkoxy-substituted alkanol in the ratio of one mole of alkanol for every mole of silicon-bonded acetoxy groups that it is desired to replace. The product is then fractionally distilled to yield the desired product or a mixture of desired products. Alternative processes are set forth in the above-mentioned Goossens patent which is hereby incorporated by reference.

Examples of carboxylic acid anhydrides which may be employed in the above reaction include acetic anhydride, propionic anhydride, mixed anhydrides such as acetic propionic anhydride, α-chloro acetic acid anhydride and trifluoroacetic acid anhydride.

Examples of alkanols which may be employed in the above-described process include t-butyl alcohol, t-amyl alcohol, methanol, ethylenecyanohydrin, ethylene chlorohydrin, beta-nitroethanol, ethanol, sec-butanol, and methoxy-ethanol.

The preferred group of silanes which may be employed as cross-linking agents, chain extending agents and modulus improving agents in an RTV composition of this invention are those within the scope of the formula below, wherein all R's and subscripts are as described previously.

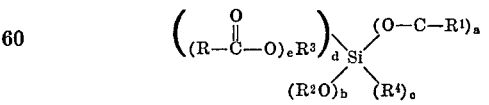

When the silane is employed as a cross-linking agents, $a$ has a value of 3 and the more preferred silanes are

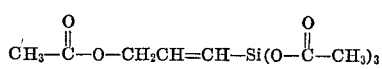

and

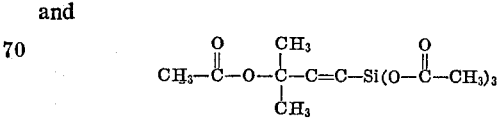

When it is desired to have a chain extending agent employed in combination with the cross-linking agent, $a$ has a value of 2 resulting in the silane being difunctional. Preferred difunctional silanes are

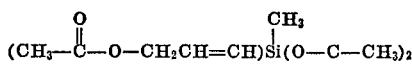
and
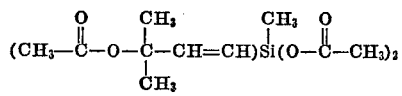

The presence of a chain extending agent results in a final cured product having a higher degree of elasticity. The same result generally may be obtained by using a higher molecular weight silanol-stopped fluid; however, the use of such a higher molecular weight silanol-stopped fluid may result in a curable composition having a much higher viscosity than is desired.

When it is desired to improve the modulus of elasticity, a silane of Formula 1 wherein $a$ has a value of one is incorporated into the RTV composition. The preferred silanes for this application are

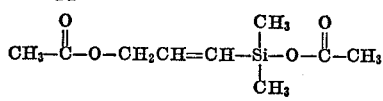
and
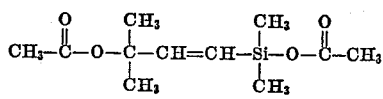

The use of these monofunctional silane chain-terminating units in combination with the cross-linking and optionally chain extending silanes discussed above, not only results in a higher modulus of elasticity but in many instances also improves the adhesion of the cured compositions to a substrate.

The adhesion of RTV's, cross-linked, chain-extended and chain-terminated by use of the above silanes, to specific substrates such as aluminum can be improved markedly by having one or more tert-alkoxy groups as silicon substituents. The t-butoxy groups are preferred.

The preferred silanol chain-stopped polydiorganosiloxanes to be used in combination with the silane cross-linking agent described above are silanol chain-stopped polydiorganosiloxanes having a viscosity in the range of about 100 centipoises to 50,000 centipoises at 25° C. The preferred polydiorganosiloxanes are polydimethylsiloxanes having from about 10 to about 15,000 dimethylsiloxy units per molecule and may contain some t-butoxy groups. The presence of such tertiary alkoxy groups such as t-butoxy groups also improves the adhesion of the RTV's of the present invention.

Generally speaking, in a preferred embodiment of the present invention, R is an alkyl radical of not more than 4 carbon atoms, $R^1$ is an alkyl radical of not more than 4 carbon atoms, $R^2$ is a t-butyl radical, $R^3$ is an olefinically unsaturated divalent hydrocarbon radical of not more than 5 carbon atoms, at least 50% of the groups represented by $R^5$ and $R^6$ are methyl radicals, the remainder being phenyl and $n$ is a number from 10 to 50,000.

When adhesion to an oxide film containing substrate is desired, di-t-butoxy-diacetoxysilane may be added to the RTV composition. The amount added may vary from 0.2 to 6.0 parts by weight based upon the weight of the silanol-stopped fluid.

Preferred silanes used in the RTV composition described in the present invention contain on the average of from 2.05 to 3 silicon-bonded acetoxy groups per silane when a fluid containing two silanol end-stopper is employed. If the number of acetoxy groups were to be two, this would merely result in a build-up of chain length. Average in this situation means the total number of silicon-bonded acetoxy groups divided by the total number of silane molecules used in the RTV composition. The number, of course, can drop below two when the silanol-stopped polydiorganosiloxane contains more than two silanol groups per molecule. This occurs when there is chain branching in the polydiorganosiloxane and no chain stopping with non-reactive groups such as t-butoxy groups or alkyl groups.

The preferred RTV composition of the present invention includes a tin catalyst such as dibutyltindilaurate or tin octoate. For deep section cure, a preferred catalyst is basic dimethyltinoleate.

A preferred RTV composition of the present invention also includes a filler, the most preferred of which is the silazane treated silica filler disclosed and claimed in application Ser. No. 789,352 of Smith, filed Jan. 6, 1969. A filler preferably may be used in an amount of from about 10 to about 100 parts of filler per 100 parts of the silanol chain-stopped polydiorganosiloxane.

The silazane treated filler may be prepared by the following procedure. A fumed silica filler is contacted with ammonia for about 1½ hours at 25° C. with agitation. Hexamethyldisilazane is added to the treated filler in an amount of about 20 parts per 100 parts of treated filler and the mixture is heated at about 130° C. for about 2 hours. Water in an amount of about one part by weight is added to the mixture and heating is continued at 130° C. for an additional hour. The treated silica filler is then purged with $N_2$ at 130° C. until the $NH_3$ content is 50 p.p.m.

The following examples are illustrative of the practice of the present invention and are not intended for purposes of limitation. All parts are by weight. The SiH-acetylene addition catalyst which was used in the following examples was prepared according to the teachings of Example 1 of U.S. Pat. 3,229,972 of Lamoreaux, and the catalyst was dissolved in octyl alcohol to a concentration of 3.8% of platinum (as metal) based upon the total weight of the solution. The catalyst solution will hereinafter be referred to as "catalyst."

EXAMPLE 1

A reaction flask was equipped with stirrer, thermometer, reflux condenser and addition funnel. To the flask was charged 343 parts of propargyl acetate and 3 parts of the catalyst. The resulting solution was heated to 60° C., then 521 parts of trichlorosilane was added slowly over a 10 hour period with gentle stirring. The rate of silane addition and external heating was adjusted such that the reaction temperature steadily increased from 60° C. to 115° C. during the 10 hour addition time. Following completion of the addition reaction, the crude reaction mixture was transferred to a distillation apparatus. Distillation at reduced pressures yielded 770 parts of the desired adducts boiling at 68–74° C./7 mm. Hg. (Found—45.7% hydrolyzable Cl; theory—45.6% Cl.) Gas chromatographic analysis of the product indicated that two components were present. Since the Cl analyses were in agreement with the formula $H_7C_5SiO_2Cl_3$, the two components correspond to the isomeric adducts:

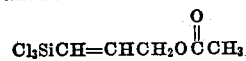
and
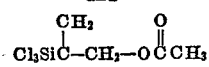

The second component was present as a minor impurity and the material produced will be referred to as acetoxypropenylenyltrichlorosilane.

To a reaction flask was added 222 parts of the acetoxypropenylenyltrichlorosilane

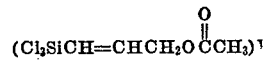

A small amount of the isomeric adduct is also present. The flask was equipped with thermometer, magnetic stirrer and distillation head with condenser. The chlorosilane was treated with 408 parts of acetic anhydride and upon stirring a mild exotherm was noted. The mixture was heated to reflux and acetyl chloride removed by distillation to a reaction mixture temperature of 100° C. Gas chromatographic analysis of the mixture indicated that acetylation was complete. The remaining volatile components were removed by distilation to a flask temperature of 90° C. at 12 mm. Hg. The resulting liquid amounted to 281 parts resulting in a 97% yield. The infrared spectrum of the material was consistent with the proposed structure. The acetoxypropenylenyltriacetoxysilane was used to prepare an RTV which was compared against a control formulation.

A base fluid containing the following constituents was prepared by mixing 100 parts of a silanol-terminated fluid containing an average of 810 dimethylsiloxy units of the formula

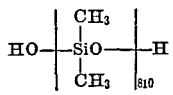

20 parts of octamethylcyclotetrasiloxane treated fumed silica (the silica had a surface area of about 200 sq. meters per gram) and 15 parts of a process aid prepared according to the teachings of U.S. Pat. 3,382,205. The process aid consisted of 5 mole percent trimethylsiloxy units, 20 mole percent monomethylsiloxy units, 75 mole percent of dimethylsiloxy units and contained 0.5 weight percent silanol. The fluid had a viscosity of 20 centipoises.

To 100 parts of the base fluid were added 5 parts of acetoxypropenylenyltriacetoxysilane and 0.07 part of dibutyltindilaurate. A control formulation was prepared using 5 parts of methyltriacetoxysilane in place of the acetoxypropenylenyltriacetoxysilane. After curing, the properties measured were:

|  | Acetoxypropenylenyltriacetoxysilane based RTV | Control, methyltriacetoxysilane based RTV |
| --- | --- | --- |
| Tear | 49 | 40 |
| Peel adhesion from aluminum | 46 | 35 |

EXAMPLE 2

To a reaction flask containing 103 parts of triacetoxysilane and ½ part catalyst and heated to 120° C. was added slowly 29 parts of propargyl acetate. A very exothermic reaction occurred. The reaction temperature at times climbed to 220° C. When the addition of propargyl acetate was complete, the reaction mixture was heated to 120° C. for 3 hours. Gas chromatographic analysis (VPC) of the mixture showed the presence of a high boiling adduct with very little starting material remaining. Upon distillation of the reaction mixture, a fraction with a boiling range of 140–170° C./0.5 mm. Hg was collected. The weght of product was 120 parts.

The product was identified as acetoxypropenylenyltriacetoxysilane

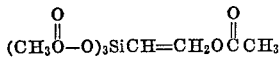

Its purity by VPC was 98% and the product distilled at 128° C. at 0.4 mm. Hg. The structure was established by its infrared spectrum.

EXAMPLE 3

To a reaction flask containing 252 parts of 1,1-dimethylpropargylacetate and 1½ parts of catalyst and heated to 95° C. was added slowly 271 parts of trichlorosilane. The reaction mixture was kept at total reflux by external heat. After about 2 hours the reaction temperature began to increase from 46° C. and after 6 hours, the reflux temperature reached 80° C. A gas chromatographic analysis of the reaction mixture at this time showed that an adduct had formed and was present in a concentration of about 65% of the reaction mixture. The reaction was continued until the reflux temperature reached 110° C. and the reaction mixture was then distilled. The product distilled at 68 to 72° C. at 1 mm. Hg. There was obtained 422 parts of product which analyzed 98% purity via gas chromatography. The product was identified as acetoxydimethylpropenyltrichlorosilane of the formula

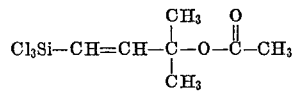

To a reaction flask was added 152 parts of the acetoxydimethylpropenyltrichlorosilane. The flask was equipped with thermometer, magnetic stirrer and distillation head with condenser. The chlorosilane was treated with 237 parts of acetic anhydride and upon stirring a mild exotherm was noted. The mixture was heated to reflux and acetyl chloride removed by distillation to a reaction temperature of 100° C. Gas chromatographic analysis of the mixture indicated that acetylation was complete. Remaining volatile components were removed by distilation to a flask temperature of 100° C. at 2 mm. Hg. The resulting liquid amounted to 186 parts resulting in a 96% yield. The infrared spectrum of the material was consistent with the proposed structure.

EXAMPLE 4

A reaction flask was equipped with stirrer, thermometer, reflux condenser and addition funnel. To the flask was charged 98 parts of propargyl acetate and 0.6 part of catalyst. The resulting solution was heated to 60° C., then 115 parts of methyldichlorosilane was slowly added with gentle stirring over a 10 hour period. After the addition was completed, the reaction mixture was heated externally to 120° C. Following completion of the addition reaction, the crude reaction mixture was transferred to a distillation apparatus. Distillation at reduced pressures yielded 195 parts of product at 60° C./0.7 mm. Hg. The product was a mixture of adducts formed by 1 and 2 addition. The product consisted of 60% of

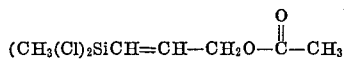

3-acetoxypropenylmethyldichlorosilane and 40% of

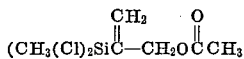

To a reaction flask was added 106 parts of the two adducts acetoxypropenylmethyldichlorosilane. The flask was equipped with thermometer, magnetic stirrer and distillation head with condenser. The chlorosilane was treated with 153 parts of acetic anhydride and upon stirring a mild exotherm was noted. The mixture was heated to reflux and acetyl chloride removed by distillation to a reaction mixture of 100° C. Gas chromatographic analysis of the mixture indicated that acetylation was complete. The remaining volatile components were removed by distillation to a flask temperature of 90° C. at 12 mm. Hg. The resulting liquid amounted to 120 parts resulting in a 92% yield. The infrared spectrum of the material was consistent with the proposed structure.

EXAMPLE 5

To a reaction flask containing 103 parts of but-2-yne-1,4-diacetate and 0.6 part of catalyst and heated to 75° C. was added slowly 88.5 parts of trichlorosilane. A mild exotherm took place. The reaction mixture was heated and the heating maintained throughout the silane addition. The temperature of the reaction mixture increased to 110° C. An additional 0.3 part of catalyst was added and the reaction was maintained at total reflux for 2 hours. Upon fractional distillation an adduct distilled at 110° C./0.8 mm. Hg. The total yield of product was 155 parts. The product was analyzed for hydrolyzable chloride and also by infrared spectroscopy which analyses agreed well with the proposed structure

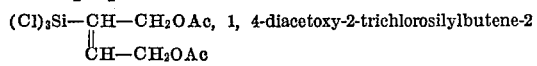   1,4-diacetoxy-2-trichlorosilylbutene-2

A reaction mixture consisting of 155 parts of the 1,4-diacetoxy-2-trichlorosilylbutene-2 and 179 parts of acetic anhydride were combined in a reaction flask and heated at reflux. Acetyl chloride was removed by distillation. When the temperature of the reaction mixture exceeded 90° C., a vacuum of 10 mm. Hg was applied and acetyl chloride and excess acetic anhydride was removed by distillation at reduced pressure. The reaction was terminated when the reaction mixture temperature reached 110° C. Upon cooling, 50 parts of anhydrous sodium acetate was added to the reaction mixture. The mixture was then stirred at room temperature overnight. The reaction mixture was filtered and was shown to be free of chloride by titration with silver nitrate solution. The product was analyzed by NMR and had the structure

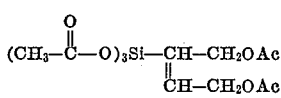

EXAMPLE 6

An RTV composition was prepared by mixing at room temperature 100 parts of a base compound, 4 parts of acetoxypropenyltriacetoxysilane, 1.5 parts of di-t-butoxydiacetoxysilane and 0.05 part of dibutyltindilaurate. The base compound consisted of 100 parts of a 10,000 centipoises viscosity silanol-terminated polydimethylsiloxane of the formula

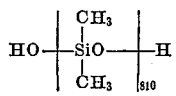

30 parts of a polydimethylsiloxane polymer having a viscosity of 570 centipoises and having on the average one terminal silanol group per polymer molecule and one terminal trimethylsilyl group per polymer molecule; and 23 parts of octamethylcyclotetrasiloxane treated fumed silica (the silica had a surface area of about 200 square meters per gram).

The RTV was cured for 3 days at 50% relative humidity and 77° F. The following physical properties were obtained:

| | |
|---|---|
| Shore A | 32 |
| Tensile, p.s.i. | 410 |
| Elongation, percent | 420 |
| Tear, lbs./in. | 40 |
| Tack free time, min. | 10 |

The tack free time was measured by release from 2 mil polyethylene film. The application rate using a ⅛″ Semco orifice at 90 p.s.i. was 385 grams per minute. The peel adhesion of the above RTV from alclad aluminum was 60 pounds per inch. The value was determined using a 20 mesh stainless steel screen imbedded in the sealant at a ⅛″ bond line. The cure time in this case was 7 days at 50% relative humidity and 77° F.

What is claimed is:

1. A fluid composition stable under substantially anhydrous conditions and curable to an elastic solid in the presence of moisture which comprises a silanol chain-stopped polydiorganosiloxane having the formula

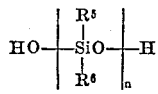

wherein $R^5$ and $R^6$ are each at least one radical having not more than 8 carbon atoms selected from the group consisting of hydrocarbyl, halohydrocarbyl, and cyano lower alkyl and may be different and $n$ is a number from about 10 to about 15,000, and at least one silane represented by the formula

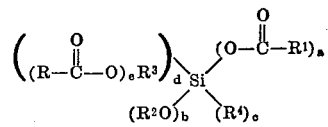

wherein R is an alkyl radical of not more than 8 carbon atoms, $R^2$ is at least one radical having not more than about 8 carbon atoms selected from the group consisting of hydrocarbyl, halohydrocarbyl, nitrohydrocarbyl, alkoxyhydrocarbyl and cyano lower alkyl and may be different; $R^1$ and $R^4$ are at least one radical having not more than about 8 carbon atoms selected from the group consisting of hydrocarbyl and halohydrocarbyl and may be different; $R_3$ is at least one unsaturated radical, attached to the Si through an olefinic carbon atom, having a valence of at least two and from about 3 to about 8 carbon atoms selected from the group consisting of divalent and trivalent unsaturated hydrocarbon radicals, and halo and alkoxy-substituted divalent and trivalent hydrocarbon radicals; $a$ is an integer of 1 through 3, $b$ is a whole number of 0 through 2, $c$ is a whole number of 0 through 2, $d$ is an integer of 1 through 3, and $e$ is an integer of 1 through 2 and the sum of $a$, $b$, $c$ and $d$ is 4.

2. The composition of claim 1 further characterized by at least about 50% of the total number of $R^5$ and $R^6$ groups being methyl radicals.

3. The composition of claim 2 further characterized by the remaining $R^5$ and $R^6$ groups being phenyl radicals.

4. The composition of claim 1 further characterized by R, $R^1$, $R^2$ and $R^4$ being alkyl radicals and $R^3$ being a divalent unsaturated hydrocarbon radical.

5. The composition of claim 1 further characterized by R, $R^1$ and $R^4$ being alkyl radicals, $R^3$ being a divalent unsaturated hydrocarbon radical and $b$ being 0.

6. The composition of claim 1 further characterized by R, $R^1$, $R^2$ and $R^4$ being alkyl radicals, $R^3$ being a divalent unsaturated hydrocarbon radical and $b$ being one.

7. The composition of claim 1 further characterized by R, $R^1$, and $R^4$ being alkyl radicals, $R^3$ being a propenylene radical and $b$ being 0.

8. The composition of claim 1 further characterized by R, $R^1$ and $R^4$ being methyl radicals, and $R^3$ being a divalent unsaturated hydrocarbon radical.

9. The composition of claim 1 further characterized by R, $R^1$ and $R^4$ being methyl, and $R^3$ being a 3,3-dimethylpropylene radical.

10. The composition of claim 1 further characterized by at least one silane being a mixture of silanes of the formula as defined.

11. The composition of claim 10 further characterized by the at least one silane being a silane represented by the formula

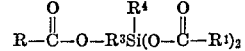

mixed with a silane represented by the formula

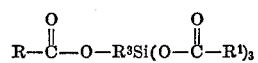

12. The composition of claim 11 further characterized by the at least one silane consisting of a silane being selected from the class consisting of

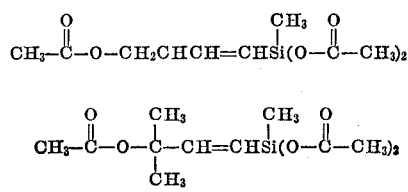

and mixed with a silane selected from the group consisting of a silane represented by the formula

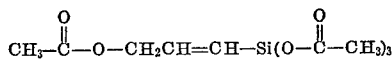

and a silane represented by the formula

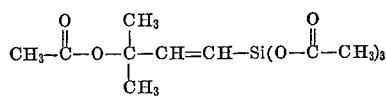

13. The composition of claim 12 further characterized by the at least one silane consisting of a silane being represented by the formula

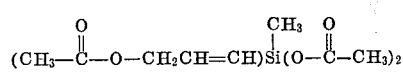

and a silane represented by the formula

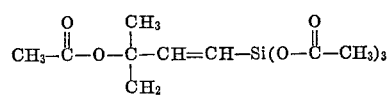

14. The composition of claim 1 further characterized by R, $R^2$ and $R^6$ being alkyl radicals, $R^3$ being a propenylene radical and $b$ being one.

15. The composition of claim 1 further characterized by $R^2$ and $R^4$ being alkyl radicals.

16. The composition of claim 1 further characterized by R, $R^1$, $R^2$ and $R^4$ being alkyl radicals and $R^3$ being a propenylene radical.

17. The composition of claim 1 further characterized by R, $R^1$ and $R^4$ being methyl radicals and $R^3$ being a propenylene radical.

18. The composition of claim 1 further characterized by having a filler present.

19. The composition of claim 1 further characterized by having a filler and catalyst present which is a carboxylic acid salt and/or chelate of a metal ranging from lead to manganese, inclusive, in the electromotive series of metals.

20. The composition of claim 1 further characterized by having a catalyst present which is a carboxylic acid salt and/or chelate of a metal ranging from lead to manganese inclusive, in the electromotive series of metals.

21. The composition of claim 20 further characterized by the catalyst being basic dimethyl tin oleate.

22. The composition of claim 1 when cured to an elastic solid.

23. The composition of claim 1 further characterized by having at least about 50% of the organo groups of the silanol chain-stopped polydiorganosiloxane being methyl radicals, R and $R^1$ being alkyl radicals, $R^2$ being a t-butyl radical and $R^3$ being a propenylene radical.

24. The composition of claim 1 further characterized by having at least 50% of the organo groups of the silanol chain-stopped polydiorganosiloxane being methyl, R, $R^1$ and $R^6$ being methyl radicals, $R^3$ being a 3,3-dimethylpropenylene radical and $b$ being 0.

25. A method of forming a fluid composition stable under substantially anhydrous conditions and curable to an elastic solid in the presence of moisture which comprises mixing in the substantial absence of moisture, a silanol chain-stopped polydiorganosiloxane having the formula,

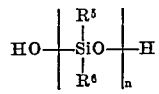

wherein $R^5$ and $R^6$ are each at least one radical having not more than 8 carbon atoms selected from the group consisting of hydrocarbyl, halohydrocarbyl, and cyano lower alkyl and may be different and $n$ is a number from about 10 to about 15,000, and at least one silane represented by the formula,

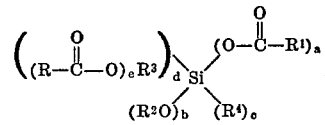

said silane having an average of at least 2.05 silicon-bonded acyloxy radicals per silicon atom, wherein R is an alkyl radical of up to 8 carbon atoms, and $R^2$ is a radical having not more than about 8 carbon atoms selected from the group consisting of hydrocarbyl, halohydrocarbyl, nitrohydrocarbyl, alkoxyhydrocarbyl and cyano lower alkyl and may be different; $R^1$ and $R^4$ are at least one radical having not more than about 8 carbon atoms selected from the group consisting of hydrocarbyl and halohydrocarbyl and may be different; $R^3$ is at least one unsaturated radical, attached to the Si through an olefinic carbon atom, having a valence of at least two and from about 3 to about 8 carbon atoms selected from the group consisting of divalent and trivalent unsaturated hydrocarbon radicals, and halo and alkoxy-substituted divalent and trivalent hydrocarbon radicals; $a$ is an integer of 1 through 3, $b$ is a whole number of 0 through 2, $c$ is a whole number of 0 through 2, $d$ is an integer of 1 through 3 and $e$ is an integer of 1 through 2 and the sum of $a$, $b$, $c$ and $d$ is 4.

26. The method of claim 25 further characterized by at least about 50% of the total number of $R^5$ and $R^6$ groups being methyl radicals.

27. The method of claim 25 further characterized by the remaining $R^5$ and $R^6$ groups being phenyl radicals.

28. The method of claim 25 further characterized by R, $R^1$, $R^2$ and $R^4$ being alkyl radicals, and $R^3$ being a divalent unsaturated hydrocarbon radical.

29. The method of claim 25 further characterized by R, $R^1$ and $R^6$ being alkyl radicals, $R^3$ being a divalent unsaturated hydrocarbon radical and $b$ being zero.

30. The method of claim 25 further characterized by R, $R^1$, $R^2$ and $R^6$ being alkyl radicals, $R^3$ being a divalent unsaturated hydrocarbon radical and $b$ being one.

31. The method of claim 25 further characterized by R, $R^1$ and $R^6$ being alkyl radicals, $R^3$ being a propenylene radical and $b$ being zero.

32. The method of claim 25 further characterized by R, $R^1$ and $R^6$ being methyl and $R^3$ being a divalent unsaturated hydrocarbon radical.

33. The method of claim 25 further characterized by R, $R^1$ and $R^4$ being methyl and $R^3$ being a propenylene radical and $b$ being zero.

34. The method of claim 25 further characterized by the at least one silane being a mixture of silanes of the formula as defined.

35. The method of claim 25 further characterized by the mixture of a silane represented by the formula

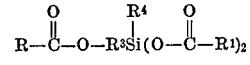

mixed with a silane represented by the formula

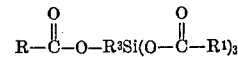

36. The method of claim 35 further characterized by the composition consisting of a silane selected from the class consisting of

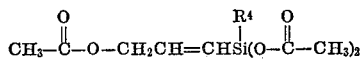

and

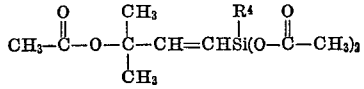

mixed with a silane selected from the class consisting of a silane represented by the formula

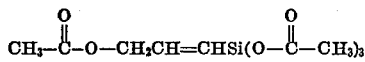

and a silane represented by the formula

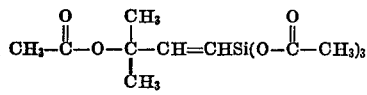

37. The method of claim 36 further characterized by the mixture consisting of a silane represented by the formula

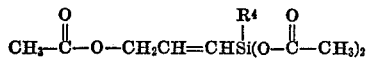

and a silane represented by the formula

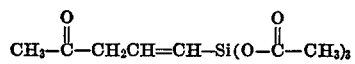

38. The method of claim 37 further characterized by R, $R^2$ and $R^6$ being alkyl radicals, $R^3$ being propenylene radicals and $b$ being one.

39. The method of claim 25 further characterized by R, $R^1$, $R^2$ and $R^4$ being alkyl radicals and $R^3$ being a propenylene radical.

40. The method of claim 25 further characterized by R, $R^1$ and $R^6$ being methyl radicals and $R^3$ being a propenylene radical.

41. The method of claim 25 further characterized by having a filler present.

42. The method of claim 25 further characterized by having a filler and catalyst present which is a carboxylic acid salt and/or chelate of a metal ranging from lead to manganese, inclusive, in the electromotive series of metals.

43. The method of claim 25 further characterized by having a catalyst present which is a carboxylic acid salt and/or chelate of a metal ranging from lead to manganese, inclusive, in the electromotive series of metals.

44. The method of claim 43 further characterized by the catalyst being basic dimethyl tin oleate.

45. The method of claim 25 further characterized by having at least 50% of the organo groups of the silanol chain-stopped polydiorganosiloxane being methyl, R, $R^1$ and $R^6$ being alkyl radicals, $R^2$ being a t-butyl radical and $R^3$ being a propenylene radical.

46. The method of claim 25 further characterized by having at least about 50% of the organo groups of the silanol chain-stopped polydiorganosiloxane being methyl, R, $R^1$ and $R^4$ being methyl radicals, $R^3$ being a propenylene radical and $b$ being zero.

References Cited

UNITED STATES PATENTS

| | | | |
|---|---|---|---|
| 3,555,051 | 1/1971 | Marsden et al. | 260—348 |
| 3,474,064 | 10/1969 | Hittmair et al. | 260—37 |
| 3,296,161 | 1/1967 | Kulpa | 260—18 |

DONALD E. CZAJA, Primary Examiner

M. I. MARQUIS, Assistant Examiner

U.S. Cl. X.R.

117—135.1, 138.8 E; 161—193, 207; 260—32.85 B, 33.2 SB, 33.6 SB, 33.8 SB, 37 SB 46.5 Y, 46.5 G, 46.5 UA, 825